(12) United States Patent
Yamashita et al.

(10) Patent No.: US 9,013,051 B2
(45) Date of Patent: Apr. 21, 2015

(54) HYBRID TYPE CONSTRUCTION MACHINE

(71) Applicant: Kobelco Construction Machinery Co., Ltd., Hiroshima-shi (JP)

(72) Inventors: Koji Yamashita, Hiroshima (JP); Mitsunori Hirozawa, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 14/100,308

(22) Filed: Dec. 9, 2013

(65) Prior Publication Data
US 2014/0183876 A1  Jul. 3, 2014

(30) Foreign Application Priority Data
Dec. 28, 2012 (JP) .................................. 2012-286991

(51) Int. Cl.
| | | |
|---|---|---|
| F02N 11/06 | (2006.01) | |
| H02P 9/04 | (2006.01) | |
| F02N 11/08 | (2006.01) | |
| E02F 9/20 | (2006.01) | |

(52) U.S. Cl.
CPC .......... *F02N 11/0862* (2013.01); *E02F 9/2075* (2013.01)

(58) Field of Classification Search
CPC ............................ F02N 11/0862; E02F 9/2075
USPC ....... 290/36 R, 40 R, 40 B, 40 C, 50; 701/50; 37/348, 414; 318/139
See application file for complete search history.

(56) References Cited

U.S. PATENT DOCUMENTS

| | | | |
|---|---|---|---|
| 6,225,784 B1 | 5/2001 | Kinoshita et al. | |
| 6,789,335 B1 | 9/2004 | Kinugawa et al. | |
| 7,069,673 B2 * | 7/2006 | Kagoshima et al. | ............ 37/348 |
| 2008/0111508 A1 * | 5/2008 | Dasgupta et al. | ............ 318/139 |
| 2011/0057596 A1 * | 3/2011 | Kagoshima | .................. 318/490 |
| 2011/0254513 A1 * | 10/2011 | Kagoshima | .................. 320/162 |
| 2011/0288711 A1 | 11/2011 | Yanagisawa | |

(Continued)

FOREIGN PATENT DOCUMENTS

| | | |
|---|---|---|
| EP | 1 126 086 A1 | 8/2001 |
| EP | 2 377 710 A2 | 10/2011 |

(Continued)

OTHER PUBLICATIONS

Extended European Search Report issued on Dec. 19, 2014 in Patent Application No. 13197070.9.

*Primary Examiner* — Tulsidas C Patel
*Assistant Examiner* — Viet Nguyen
(74) *Attorney, Agent, or Firm* — Oblon, McClelland, Maier & Neustadt, L.L.P.

(57) ABSTRACT

Provided is a construction machine capable of achieving an energy conservation effect while restraining overcharge of an electrical storage device, including an engine, a slewing electric motor, an electrical storage device, a generator-motor, and an assist controller which causes the generator-motor to assist the engine to consume an electric power equal to or more than an electric power equal to a difference between the regeneration power and the maximum allowable charge amount, when a regeneration power regenerated by the slewing electric motor is equal to or more than a maximum allowable charge amount which is a maximum amount of an electric power within which the electrical storage device can be charged.

3 Claims, 3 Drawing Sheets

(56) References Cited

U.S. PATENT DOCUMENTS

| | | | |
|---|---|---|---|
| 2012/0104770 A1* | 5/2012 | Jacob | 290/40 B |
| 2012/0109472 A1* | 5/2012 | Yanagisawa | 701/50 |
| 2013/0151087 A1* | 6/2013 | Doi et al. | 701/50 |
| 2013/0307443 A1* | 11/2013 | Hirozawa | 318/139 |
| 2014/0054902 A1* | 2/2014 | Kawaguchi et al. | 290/40 B |
| 2014/0277970 A1* | 9/2014 | Sakamoto et al. | 701/50 |

FOREIGN PATENT DOCUMENTS

| | | |
|---|---|---|
| EP | 2 377 710 A3 | 10/2011 |
| EP | 2 383 880 A1 | 11/2011 |
| JP | 2000-283107 | 10/2000 |

\* cited by examiner

HYBRID TYPE CONSTRUCTION MACHINE

BACKGROUND OF THE INVENTION

1. Field of the Invention

The present invention relates to a hybrid type construction machine using both an engine power and an electric power.

2. Description of the Related Art

There is conventionally known a hybrid construction machine such as a hybrid shovel. For example, Japanese Patent Application Laid-Open No. 2000-283107 discloses a construction machine including a hydraulic pump, a generator-motor, an engine which is a power source for driving the hydraulic pump and the generator-motor, a hydraulic actuator which is driven by a hydraulic fluid delivered by the hydraulic pump, an electrical storage device which is charged with an electric power generated by the generator-motor, and a slewing electric motor which is driven by the electric power stored in the electrical storage device.

According to the construction machine, there is a possibility of ignition or fail of the electrical storage device due to an increase in a charging rate of the electrical storage device beyond an upper limit, namely, overcharging. Consequently, there is need for controlling a charge amount of the electrical storage device so as to prevent the charging rate of the electrical storage device from exceeding the upper limit.

However, regulating the charging rate of the electrical storage device in a prescribed range under all the conditions narrows a range of the charging rate and hinder the hybrid type construction machine from sufficiently achieving its performance. Furthermore, it involves a problem of impossibility of using a full capacity of the electrical storage device and obtaining an energy-conservation effect.

SUMMARY OF THE INVENTION

It is an object of the present invention to provide a construction machine capable of achieving an energy conservation effect while restraining an electrical storage device from being overcharged. Provided by the present invention is a construction machine including: a lower traveler; an upper slewing body mounted on the lower traveler so as to be capable of being slewed; an engine having an output shaft; an engine assist motor connected to the output shaft of the engine to be capable of assisting the engine with consumption of an electric power; a slewing electric motor which slews the upper slewing body and regenerates an electric power when the upper slewing body is braked; a regeneration power detector which detects the regeneration power; an electrical storage device electrically connected to the engine assist motor and the slewing electric motor to be capable of being charged with the regeneration power and discharging electricity; a charging rate detector which detects a charging rate of the electrical storage device; a maximum-allowable-charge-amount calculator which calculates a maximum allowable charge amount which is a maximum amount of the electric power within which the electrical storage device is allowed to be charged, on the basis of the charging rate detected by the charging rate detector; and an assist controller which causes the engine assist motor to assist the engine to consume an electric power equal to or more than an electric power equal to a difference between the regeneration power and the maximum allowable charge amount, when the regeneration power detected by the regeneration power detector is equal to or more than the maximum allowable charge amount calculated by the maximum-allowable-charge-amount calculator.

DESCRIPTION OF THE PREFERRED EMBODIMENTS

There will be given an explanation of an embodiment of the present invention in reference to the drawings as follows.

Figure 1:
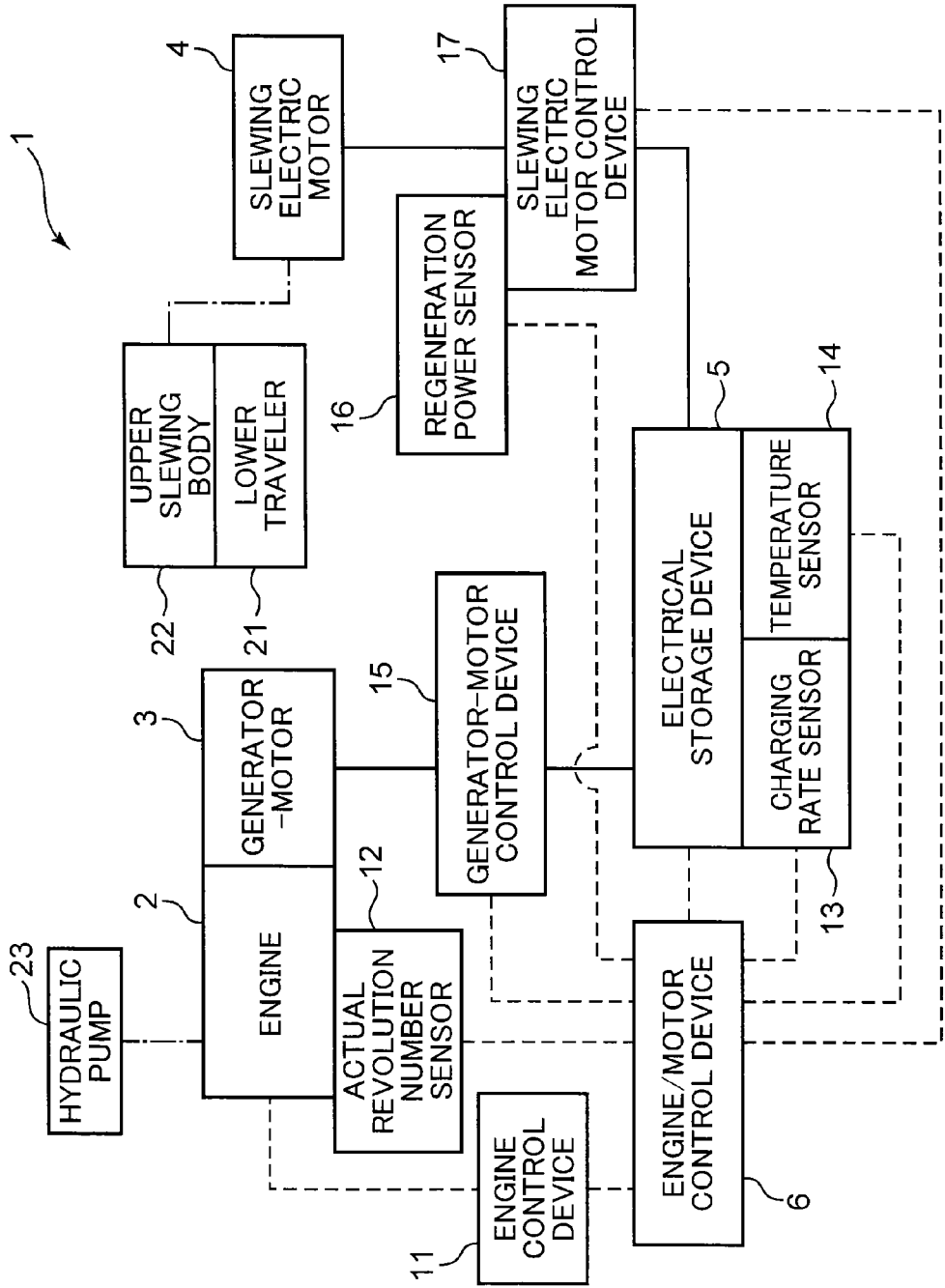
FIG. 1 is a block diagram showing essential constituent elements of a construction machine according to an embodiment of the present invention.

FIG. 1 shows essential constituent elements of a construction machine 1 according to an embodiment of the present invention. The construction machine 1 is a hybrid type construction machine such as a hybrid shovel or the like, including a lower traveler 21, an upper slewing body 22 mounted on the lower traveler 21 so as to be capable of being stewed, an engine 2 having an output shaft, a generator-motor 3 which is an engine assist motor connected to the output shaft of the engine 2, a stewing electric motor 4 for slewing the upper stewing body 22, an electrical storage device 5 electrically connected to the generator-motor 3 and the stewing electric motor 4, an engine/motor control device 6, a hydraulic pump 23 which is a device connected to the output shaft of the engine 2, an engine control device 11, an actual-revolution-number sensor 12 as an actual-revolution-number detector, a charging rate sensor 13 as a charging-rate detector, a temperature sensor 14 as a temperature detector, a generator-motor control device 15, a regeneration power sensor 16 as a regeneration power detector, and a slewing-electric-motor control device 17. In FIG. 1, a one-dotted chain line designates a mechanical coupling, a bold line designates a connection by a power line for transmitting an electric power, and a broken line designates a connection by a signal line for transmitting/receiving a signal.

The engine 2 is a power source of the hydraulic pump 23. The hydraulic pump 23 is driven by a power generated by the engine 2 to thereby deliver a hydraulic fluid for driving a hydraulic actuator, not illustrated (for example, in a shovel, a boom cylinder, an arm cylinder, a bucket cylinder, a traveling hydraulic motor or the like). The engine control device 11 controls a revolution number of the engine 2. The actual-revolution-number sensor 12 detects an actual revolution number which is an actual revolution number of the engine 2. Incidentally, the device to be connected to the output shaft of the engine, in the present invention, is not limited to the hydraulic pump but may be other devices.

The generator-motor 3 is revolved by an electric power stored in the electrical storage device 5 to thereby assist the engine 2 in driving the hydraulic pump 23. The generator-motor 3 generates a power using a part of an output of the engine 2 when there is an allowance in a load on the engine 2, and charges the electrical storage device 5 with the generated power. The generator-motor control device 15 controls an operation of the generator-motor 3 and controls the charge and the discharge of and from the electrical storage device 5 in accordance therewith.

The slewing electric motor 4 is driven by the electric power stored in the electrical storage device 5 to thereby slew the upper slewing body 22. Conversely, when the upper slewing body 22 is braked, the slewing electric motor 4 is operated as a generator, and the electrical storage device 5 is charged with a regeneration power regenerated by the braking. The regeneration power sensor 16 detects the regeneration power regenerated by the slewing electric motor 4. The slewing-electric-motor control device 17 controls an operation of the slewing electric motor 4 and controls the charge and discharge of and from the electrical storage device 5 in accordance therewith.

The electrical storage device 5 includes a battery of a nickel-hydrogen battery, a lithium-ion battery or the like, adapted to be charged with a generated power generated by the generator-motor 3 and the regeneration power regenerated by the slewing electric motor 4, and to discharge the stored electric power. The electrical storage device 5 is charged within a range of an allowable charge amount. The charging rate sensor 13 detects a charging rate of the electrical storage device 5. The charging rate of the electrical storage device 5 can be calculated, for example, by integrating a current of the electrical storage device 5. The temperature sensor 14 detects a temperature of the electrical storage device 5.

The engine/motor control device 6 integrally controls a total of the construction machine 1 by controlling the engine control device 11, the generator-motor control device 15, and the slewing-electric-motor control device 17. The specification thereof is as follows.

Figure 2:
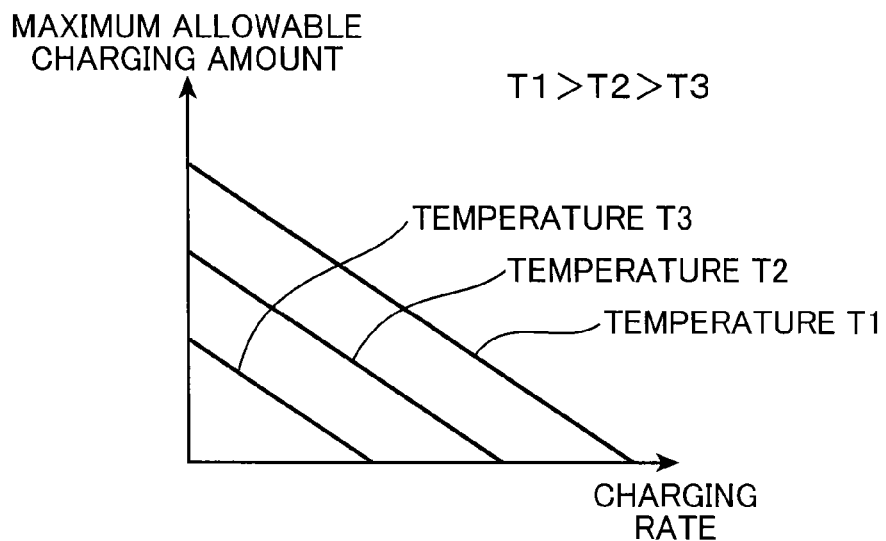
FIG. 2 is a graph showing a relationship between a charging rate and a maximum allowable charge amount of an electrical storage device in the construction machine.

First, the engine/motor control device 6 functions as a maximum-allowable-charge-amount calculator. Specifically, the engine/motor control device 6 calculates a maximum allowable charge amount which is a maximum amount of an electric power within which the electrical storage device 5 is allowed to be charged at a current time point, on the basis of the temperature of the electrical storage device 5 measured by the temperature sensor 14 and a charging rate of the electrical storage device 5 detected by the charging rate sensor 13. As shown in FIG. 2, the higher the temperature of the electrical storage device 5, the more increased the maximum allowable charge amount of the electrical storage device 5. Accordingly, the maximum allowable charge amount of the electrical storage device 5 at a temperature T1 is larger than that of the electrical storage device 5 at a temperature T2 lower than the temperature T1. Similarly, the maximum allowable charge amount of the electrical storage device 5 at the temperature T2 is larger than the maximum allowable charge amount of the electrical storage device 5 at a temperature T3 lower than T2.

The engine/motor control device 6 judges whether the regeneration power detected by the regeneration power sensor 16 is equal to or more than the calculated maximum allowable charge amount of the electrical storage device 5. In the case of judging that the detected regeneration power is equal to or larger than the calculated maximum allowable charge amount, the engine/motor control device 6 controls the engine control device 11, the generator-motor control device 15, and the slewing-electric-motor control device 17 so as to cause the generator-motor 3 to assist the engine 2 to consume an electric power equal to or more than an electric power equal to the difference between the regeneration power and the maximum allowable charge amount (the electric power equal to the difference corresponds to a surplus electric power out of the maximum electric power within which the electrical storage device 5 can be charged). Thus, the engine/motor control device 6 constitutes an assist controller in cooperation with the other control devices 11, 15, and 17.

Also, the engine/motor control device 6 instructs the engine control device 11 to reduce the revolution number of the engine 2 in the case where a difference between the actual revolution number of the engine 2 detected by the actual-revolution-number sensor 12 and the revolution number of the engine 2 controlled by the engine control device 11 exceeds a prescribed range as a result of causing the generator-motor 3 to assist the engine 2. Thus, the engine/motor control device 6 constitutes a revolution-number controller in cooperation with the engine control device 11.

Figure 3:
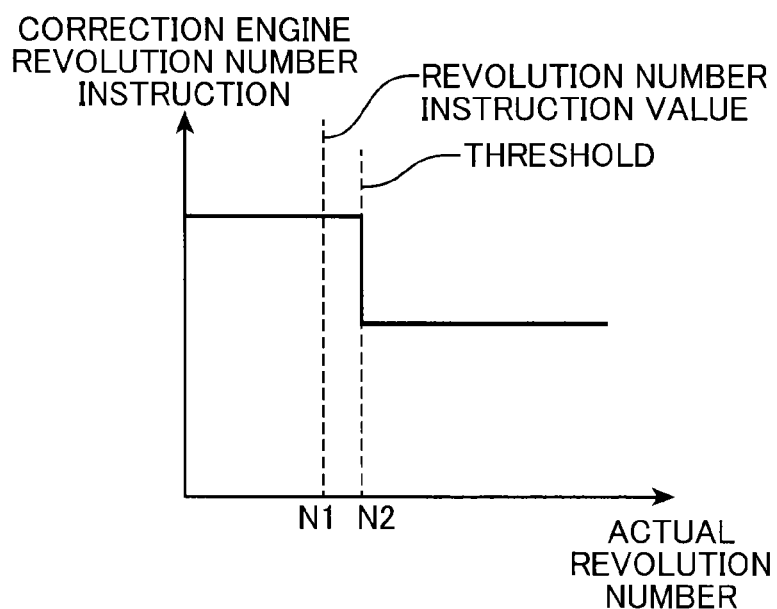
FIG. 3 is a graph showing a relationship between an actual revolution number of an engine and a correction engine-revolution-number instruction in the construction machine.

The engine control device 11 reduces the revolution number of the engine 2 by providing, to the engine 2, a correction engine-revolution-number instruction for causing the engine 2 to reduce the revolution number thereof. Specifically, as shown in FIG. 3, the engine control device 11 provides the correction engine-revolution-number instruction to the engine 2 in the case where the actual revolution number of the engine 2 exceeds a revolution number instruction value N1 in correspondence with the revolution number of the engine 2 controlled by the engine control device 11, and the difference between the actual revolution number of the engine 2 and the revolution number instruction value N1 exceeds a difference between a previously set threshold N2 and the revolution-number instruction value N1.

Figure 4:
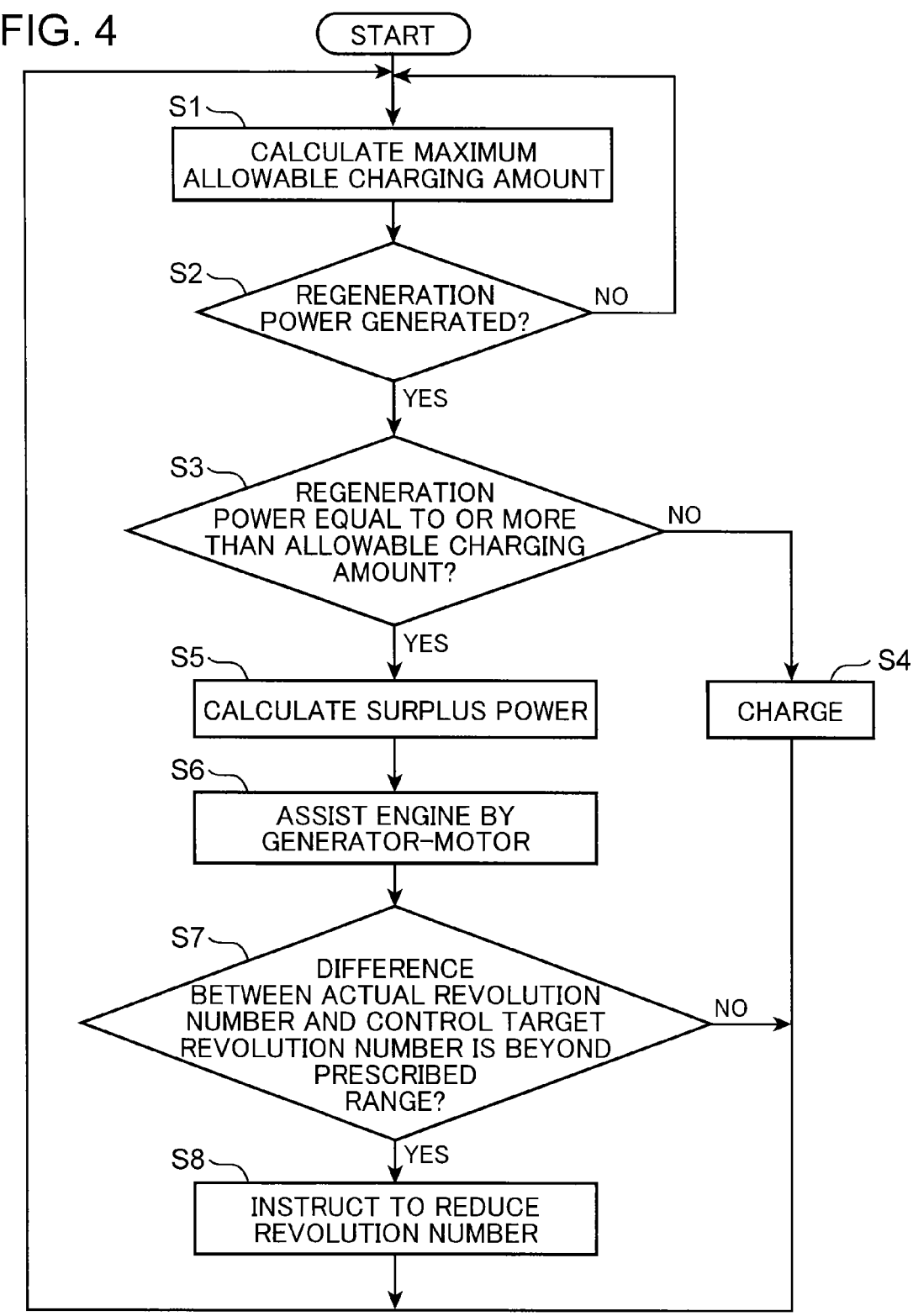
FIG. 4 is a flowchart showing an arithmetic and logical control operation which is carried out in the construction machine.

Next will be given an explanation about an arithmetic and control operation which is carried out at the construction machine 1 in reference to the flowchart shown in FIG. 4.

First, based on the temperature of the electrical storage device 5 detected by the temperature sensor 14 and the charging rate detected by the charging rate sensor 13, the engine/motor control device 6 calculates a maximum allowable charge amount of the electrical storage device 5 by using a relationship diagram shown in FIG. 2 (step S1). Thus calculating the maximum allowable charge amount in accordance with the temperature of the electrical storage device 5 makes it possible to charge the electrical storage device 5 with an electric power commensurate with the capacity corresponding to the temperature of the electrical storage device 5.

Next, the engine/motor control device 6 judges whether a regeneration power is generated by the slewing electric motor 4 (step S2). In the case of judging that no regeneration power is generated by the slewing electric motor 4 (NO at step S2), the engine/motor control device 6 repeats step S1.

In the case of judging that the regeneration power is generated by the slewing electric motor 4 (YES at step S2), the engine/motor control device 6 judges whether the regeneration power regenerated by the slewing electric motor 4 is equal to or more than the maximum allowable charge amount of the electrical storage device 5 (step S3). In the case of judging that the regeneration power is not equal to or not more than the maximum allowable charge amount (NO at step S3), the engine/motor control device 6 instructs the slewing-electric-motor control device 17 to charge the electrical storage device 5 with the regeneration power (step S4) and repeats step S1.

On the other hand, in the case of judging that the regeneration power is equal to or more than the maximum allowable charge amount (YES at step S3), the engine/motor control device 6 calculates an electric power produced by subtracting the maximum allowable charge amount from the regeneration power (step S5) as a surplus power, and instructs the generator-motor control device 15 to cause the generator-motor 3 to assist the engine 2 so as to consume an electric power equal to or more than the surplus power (step S6). This enables the electrical storage device 5 to be charged by full utilization of a capacity of the electrical storage device 5 within a range of the maximum allowable charge amount of the electrical storage device 5 and allows the surplus power out of the maximum electric power, within which the electrical storage device 5 is allowed to be charged, to be consumed. Besides, assisting the engine output by the generator-motor 3a enables the fuel injection amount of the engine 2 to be reduced, thereby allowing an energy conservation effect to be realized.

There is a possibility that assist of the engine by the generator-motor 3 involves an increase in an actual revolution number of the engine 2 in the case where an output of the generator-motor 3 exceeds a total of a power of the hydraulic pump 23 and a drag torque of the engine 2. To avoid it, the engine/motor control device 6 judges whether the difference between the actual revolution number of the engine 2 and a revolution number instruction value N1 which is a target revolution number for the engine control is beyond a prescribed range, that is, has become larger than a difference between the threshold N2 and the revolution number instruction value N1 (step S7); in the case of judging that the difference has not been increased beyond the prescribed range (NO at step S7), the engine/motor control device 6 repeats step S1: meanwhile, in the case of judging that the difference is beyond the prescribed range (YES at step S7), the engine/motor control device 6 instructs the engine control device 11 to provide a correction engine-revolution-number instruction for reducing the engine revolution number to the engine 2 (step S8). Then, the engine/motor control device 6 repeats step S1.

As described above, although the output of the generator-motor 3 assisting the engine 2, when exceeding the total of the power of the hydraulic pump and the drag torque of the engine 2, causes the engine 2 to be revolved by the generator-motor 3 to start increasing the actual revolution number of the engine 2, the engine/motor control device 6 and the engine control device 11 constituting the assist controller reduces the target revolution number for the engine control in the case where the difference between the actual revolution number of the engine 2 and the target revolution number for the engine control is beyond the prescribed range, thereby restraining the actual revolution number of the engine 2 from increase. This makes it possible to restrain the engine 2 or the hydraulic pump from failure due to the increase in the actual revolution number of the engine 2. Besides, the reduction in the target revolution number for the engine control allows the fuel injection amount to be reduced.

The above explanation, which has been made about the embodiment of the present invention, only exemplifies a specific example and provides no suggestion on the limitation of the present invention; a design of a specific configuration therefore can pertinently be changed. Also, the operation and effect described in the description of the preferred embodiments only enumerate the most preferable operation and effect achieved by the present invention, and the operation and effect according to the present invention are not limited to those described in the description of the preferred embodiments.

As described above, according to the present invention, there is provided a construction machine capable of achieving an energy conservation effect while restraining an electrical storage device from being overcharged. Provided is a construction machine including: a lower traveler; an upper slewing body mounted on the lower traveler so as to be capable of being slewed; an engine having an output shaft; an engine assist motor connected to the output shaft of the engine to be capable of assisting the engine with consumption of an electric power; a slewing electric motor which slews the upper slewing body and regenerates an electric power when the upper slewing body is braked; a regeneration power detector which detects the regeneration power; an electrical storage device electrically connected to the engine assist motor and the slewing electric motor to be capable of being charged with the regeneration power and discharging electricity; a charging rate detector which detects a charging rate of the electrical storage device; a maximum-allowable-charge-amount calculator which calculates a maximum allowable charge amount which is a maximum amount of the electric power within which the electrical storage device is allowed to be charged, on the basis of the charging rate detected by the charging rate detector; and an assist controller which causes the engine assist motor to assist the engine to consume an electric power equal to or more than an electric power equal to a difference between the regeneration power and the maximum allowable charge amount, when the regeneration power detected by the regeneration power detector is equal to or more than the maximum allowable charge amount calculated by the maximum-allowable-charge-amount calculator.

In this construction machine, when the regeneration power is equal to or more than the maximum allowable charge amount, that is, when a part of the regeneration power cannot be expended in charging the electrical storage device, causing the engine assist motor to assist the engine allows an electric power equal to or more than the electric power corresponding to the difference between the regeneration power and the maximum allowable charge amount, namely, a surplus power out of the maximum electric power within which the electrical storage device is allowed to be charged. This makes it possible to charge the electrical storage device by full use of a capacity of the electrical storage device within the range of the allowable charge amount, and to consume the surplus power out of the maximal electric power within which the electrical storage device can be charged. Moreover, the assist of the engine by the engine assist motor allows the fuel injection amount of the engine to be reduced, thereby enabling the energy conservation effect to be achieved.

It is preferable that the construction machine according to the present invention further includes an actual-revolution-number detector which detects an actual revolution number of the engine and a revolution number controller which controls the revolution number of the engine, and the revolution number controller reduces the revolution number of the engine in a case where a difference between the actual revolution number detected by the actual-revolution-number detector and a target revolution number for a control by the revolution number controller is beyond a prescribed range. This revolution number controller can effectively restrain the engine from an excessive revolution due to the assist of the engine by the engine assist motor. Specifically, although the output of the engine assist motor assisting the engine, when exceeding a total of a power consumed by the device connected to the output shaft of the engine and a drag torque of the engine, causes the engine to be revolved by the engine assist motor to start increasing the actual revolution number of the engine, reducing the revolution number in the case where the difference between the actual revolution number of the engine and the target revolution number for the engine control is beyond the prescribed range enables the actual revolution number of the engine to be restrained from increase. This makes it possible to restrain the engine or the device connected to the output shaft of the engine from failure due to the increase in the actual revolution number of the engine. Besides, the control of reducing the revolution number of the engine allows the fuel injection amount to be reduced.

It is preferable that the construction machine according to the present invention further includes a temperature detector which detects a temperature of the electrical storage device, and the maximum-allowable-charge-amount calculator calculates the maximum allowable charge amount on the basis of the temperature of the electrical storage device measured by the temperature detector and the charging rate detected by the charging rate detector, specifically, calculates the larger maximum allowable charge amount for the higher detected temperature. Thus calculating the maximum allowable charge amount in accordance with the temperature of the electrical storage device makes it possible to charge the electrical storage device to be charged with an electric power of a capacity in accordance with the temperature of the electrical storage device, because the maximum allowable charge amount of the electrical storage is generally increased as the temperature of the electrical storage device is raised.

This application is based on Japanese Patent application No. 2012-286991 filed in Japan Patent Office on Dec. 28, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine comprising:
   a lower traveler;
   an upper slewing body mounted on the lower traveler so as to be capable of being slewed;
   an engine having an output shaft;
   an engine assist motor connected to the output shaft of the engine to be capable of assisting the engine with a consumption of an electric power;
   a slewing electric motor for slewing the upper slewing body and regenerating a regeneration power when the upper slewing body is braked;
   a regeneration power detector for detecting the regeneration power;
   an electrical storage device electrically connected to the engine assist motor and the slewing electric motor to be capable of being charged with the regeneration power and discharging electricity;
   a charging rate detector for detecting a charging rate of the electrical storage device;
   a maximum-allowable-charge-amount calculator for calculating a maximum allowable charge amount which is a maximum amount of the electric power within which the electrical storage device is allowed to be charged, on the basis of the charging rate detected by the charging rate detector; and
   an assist controller which causes the engine assist motor to assist the engine to consume an electric power equal to or more than an electric power equal to a difference between the regeneration power and the maximum allowable charge amount, in a case where the regeneration power detected by the regeneration power detector is equal to or more than the maximum allowable charge amount calculated by the maximum-allowable-charge-amount calculator.

2. The construction machine according to claim 1, further comprising: an actual-revolution-number detector for detecting an actual revolution number of the engine; and a revolution number controller for controlling a revolution number of the engine, wherein the revolution number controller reduces the revolution number of the engine in a case where a difference between the actual revolution number detected by the actual-revolution-number detector and a target revolution number for an control by the revolution number controller is beyond a prescribed range.

3. The construction machine according to claim 1, further comprising a temperature detector for detecting a temperature of the electrical storage device, wherein the maximum-allowable-charge-amount calculator calculates the maximum allowable charge amount on the basis of the temperature of the electrical storage device measured by the temperature detector and the charging rate detected by the charging rate detector.

* * * * *